US009969584B2

(12) United States Patent
Ostendorf et al.

(10) Patent No.: US 9,969,584 B2
(45) Date of Patent: May 15, 2018

(54) METHOD FOR MONITORING A WINDING DEVICE

(71) Applicant: Windmöller & Hölscher KG, Lengerich (DE)

(72) Inventors: Michael Ostendorf, Lengerich (DE); Frank Hoffmann, Greven (DE)

(73) Assignee: Windmöller & Hölscher KG, Lengerich (DE)

( * ) Notice: Subject to any disclaimer, the term of this patent is extended or adjusted under 35 U.S.C. 154(b) by 335 days.

(21) Appl. No.: 14/908,149

(22) PCT Filed: May 28, 2014

(86) PCT No.: PCT/EP2014/061018
§ 371 (c)(1),
(2) Date: Jan. 28, 2016

(87) PCT Pub. No.: WO2015/014512
PCT Pub. Date: Feb. 5, 2015

(65) Prior Publication Data
US 2016/0207725 A1 Jul. 21, 2016

(30) Foreign Application Priority Data
Jul. 29, 2013 (DE) .................. 10 2013 108 104

(51) Int. Cl.
*B65H 18/08* (2006.01)
*B65H 26/00* (2006.01)
(Continued)

(52) U.S. Cl.
CPC ............. *B65H 18/08* (2013.01); *B65H 18/00* (2013.01); *B65H 26/00* (2013.01); *G05B 15/02* (2013.01);
(Continued)

(58) Field of Classification Search
CPC ........ B65H 18/08; B65H 18/00; B65H 26/00; G05B 15/02; G05B 19/409
(Continued)

(56) References Cited

U.S. PATENT DOCUMENTS

| 4,346,446 A | 8/1982 | Erbstein et al. |
| 2004/0133297 A1 | 7/2004 | Vergote et al. |

(Continued)

FOREIGN PATENT DOCUMENTS

| CN | 1405389 | 3/2003 |
| CN | 1488556 | 4/2004 |

(Continued)

OTHER PUBLICATIONS

Notification of Office Action and Search Report dated Aug. 11, 2017 From the State Intellectual Property Office of the People's Republic of China Re. Application No. 201480038706.5 and Its Translation Into English. (12 Pages).

(Continued)

*Primary Examiner* — Harry W Byrne

(57) ABSTRACT

The invention relates to a method for monitoring a winding device (10), comprising the following steps:
 Displaying of a schematic illustration of functional units (20) of the winding device (10) on a display device (30),
 Detection of at least one operating parameter (40) of at least one functional unit (20) of the winding device (10),
 Displaying of the at least one detected operating parameter (40) on the display device (30) next to the schematic illustration of the corresponding functional unit (20).

11 Claims, 3 Drawing Sheets

(51) Int. Cl.
    *B65H 18/00*    (2006.01)
    *G05B 19/409*   (2006.01)
    *G05B 15/02*    (2006.01)

(52) U.S. Cl.
    CPC ........ *G05B 19/409* (2013.01); *B65H 2551/18* (2013.01); *B65H 2551/20* (2013.01)

(58) Field of Classification Search
    USPC ........................................................ 700/275
    See application file for complete search history.

(56)             References Cited

U.S. PATENT DOCUMENTS

| | | |
|---|---|---|
| 2006/0217831 A1 | 9/2006 | Butterworth et al. |
| 2006/0241793 A1* | 10/2006 | Skourup ................ G05B 17/02 700/83 |
| 2013/0066614 A1 | 3/2013 | Russell |

FOREIGN PATENT DOCUMENTS

| | | |
|---|---|---|
| CN | 1721600 | 1/2006 |
| CN | 101010247 | 8/2007 |
| CN | 201545551 | 8/2010 |
| CN | 201842918 | 5/2011 |
| CN | 102712431 | 10/2012 |
| DE | 102010001014 | 9/2011 |
| DE | 102012211708 | 1/2014 |
| EP | 2090536 | 8/2009 |
| WO | WO 2015/014512 | 2/2015 |

OTHER PUBLICATIONS

International Search Report and the Written Opinion dated Aug. 28, 2014 From the European Patent Office Re. Application No. PCT/EP2014/061018 and Its Translation Into English.
Pmefungsantrag [Request for Examination] dated Jan. 20, 2014 From the Deutsches Patent-und Markenamt [German Patent and Trademark Office] Re. Application No. 102013108104.5 and Its Translation Into English.
Pmefungsantrag [Request for Examination] dated Jun. 24, 2015 From the Deutsches Patent-und Markenamt [German Patent and Trademark Office] Re. Application No. 102013108104.5 and Its Translation Into English.
Notification of Office Action and Search Report dated Jan. 4, 2017 From the State Intellectual Property Office of the People's Republic of China Re. Application No. 201480038706.5 and Its Translation Into English. (12 Pages).

* cited by examiner

METHOD FOR MONITORING A WINDING DEVICE

RELATED APPLICATIONS

This application is a National Phase of PCT Patent Application No. PCT/EP2014/061018 having International filing date of May 28, 2014, which claims the benefit of priority of German Patent Application No. 10 2013 108 104.5 filed on Jul. 29, 2013. The contents of the above applications are all incorporated by reference as if fully set forth herein in their entirety.

FIELD AND BACKGROUND OF THE INVENTION

The present invention relates to a method for monitoring a winding device and a control device for monitoring a winding device.

Basically it is known that via winding devices for example films are wound up to winding sleeves. Therewith, film reels are produced, which can be further used with a respective client. The winding occurs in the winding device. In order to be able to monitor the winding, usually at least one display device or a control device with such a display device is intended. The monitoring thereby occurs by displaying the corresponding operating parameters of the single functional units of the monitoring device.

Disadvantageously, with known control devices and with the known methods for monitoring of a winding device the monitoring occurs only little intuitive or error containing. Thus the respective information is contained on different levels of the display. Accordingly, an intensive training is necessary so that the operation personnel can perform the monitoring of the winding device with a high level of safety. Particularly, in a risky situation this leads to the fact that the decision is possibly based on wrong operating parameters. Likewise, it is possible that in this manner operating personnel which is rarely or badly trained performs an incorrect operation of the winding device.

SUMMARY OF THE INVENTION

It is the object of the present invention to at least partially avoid the previously described disadvantages. Particularly it is the object of the present invention to improve the operability, particularly the monitoring of the winding device, in a cost-efficient and simple manner.

Said object is solved by a method with the features of claim 1 and a control device with the features of claim 9. Further features and details of the invention result from the dependent claims, the description and the drawings. Thereby, features and details which are described in relation to the method according to the invention apply naturally also in relation to the control device according to the invention and vice versa so that according to the disclosure of the single aspects of the invention it can always be reciprocally related to.

A method according to the invention serves for monitoring (controlling) of a winding device and comprises the following steps:

Displaying of a schematic illustration of functional units of the winding device on a display device, Detecting of at least one operating parameter of at least one functional unit of the winding device, Displaying of at least one detected operating parameter on the display device next to the schematic illustration of the associated functional unit.

According to the invention a correlation occurs in an optical manner between the relevant functional unit and at least one associated operating parameter. A schematic illustration is thereby any form of graphic illustration, which explicitly describes or defines a function of a unit of a winding device in different levels of abstraction. This can for example be intended as a flow chart. A typical function unit of a winding device is a supply roller or a supply roll. Typical operating parameter of such supply rollers are the rotational speed or the leading, which is set between two neighboring supply rollers. The contact pressure, which enables a contact between two supply rollers can be an operating parameter according to the invention.

The schematic illustration on the display device occurs in the same manner like for the detected operating parameters. By a display also a spatial assignment of the displayed operating parameter and the correlating functional unit has to be understood next to the schematic illustration of the corresponding functional unit. Therewith, the operating parameter can for example be displayed on the left or on the right on the display device next to the schematic illustration of the respective functional unit. Likewise, a display above or underneath the corresponding functional unit is possible within the scope of the present invention. Preferably, all operating parameters in the same spatial correlation are shown, meaning for example all parameters on the left side next to the schematic illustration of the corresponding functional unit.

A method according to the invention therewith increases the level of safety of the monitoring of the winding device. Accordingly, in a graphic and therewith intuitive connection an illustration of the respective operating parameter with the corresponding functional unit can occur. This illustration occurs on one and the same display level so that no switching between the different display manuals by the operating personnel is necessary. Moreover, each operating parameter is automatically combined by the operating personnel simply and intuitively with the respective functional unit in an optically associated manner. An incorrect reading and a resulting incorrect operation of the winding device is therewith avoided with a high probability.

By a monitoring of a winding device within the scope of the present invention a passive monitoring of running and recognizing operating parameters and an active intervention in the winding device has to be understood. Therewith, the main focus of the present invention has to be understood already by the detection and display of the operating parameters as a display of the actual values of these operating parameters. Naturally, a part of the monitoring can contain an active intervention, which so to say provides the desired values for the respective operating parameters. Accordingly, for monitoring a correlation between the desired value and the actual value can be displayed, which preferably generates an even easier and more intuitive understanding of possible deviations by using a color coding.

A method according to the invention is performed as a computer program product, particularly in a control unit, meaning as a software or application. Therefore, in such a control unit a computer unit for the performance of single steps of the programs is intended. Such a control unit is preferably part of a control device for monitoring a winding device. Therewith, such a control device can comprise actors in order to transfer corresponding altered desired values of the operating parameters in modification to the single functional units of the winding device. Thereby, for example desired value specifications for the rotational speed of supply rollers or their contact pressure are involved.

The operating parameters are specific for the respective functional unit. Therewith, for each functional unit two or more operating parameters can be intended. For each functional unit specific and accordingly separately and independently detected operating parameters are provided. In order to enable the detection of the operating parameters with the control device preferably sensor units with sensor means are intended, which recognize the respective data at the corresponding functional units in the winding device.

Besides an increased safety in the operation at the same time a faster operation with a higher level of safety is possible. Therewith, a clear control is possible, which renders the actual operating state of the single functional units and therewith the complete winding device determinable in a fast and intuitive manner and at the same time with a high level of safety. Preferably, all relevant functional units of the winding device are shown in a display menu of the display device.

Besides a pure display of the operating parameters the input of desired values for these operating parameters is possible. Hereby, an active intervention in form of a monitoring is involved, for example as a controlling and/or regulation of the winding device.

Likewise, it is possible that as part of the method according to the invention one or more steps are performed as manual functions. Thereby, it is possible that a safety control of these manual performances occurs. Particularly service functions or service movements of the single rolls can be performed in this manner.

It can be an advantage when with the method according to the invention the display steps on the display device occur in form of a touch-sensitive display. A touch-sensitive display is for example a so called touchscreen. This leads to a further simplification of a corresponding control device and therewith also to the performance of the method according to the invention. Accordingly, the construction can be further reduced to the necessary construction volume for the display device. Separate manual input possibilities, for example mechanic key pads, can be avoided in this manner. At the same time for the input the same corresponding correlation is provided like for the display of the operating parameters. This leads to the same increase of the level of safety so that with a higher probability at the correct position for the correct functional unit the desired alteration of the operation parameters can be entered.

Likewise, it is an advantage when with the method according to the previous paragraph a key pad is shown on the display device due to a selection of a shown operation parameter. The key pad is particularly a numeric keyboard with numeric keys from 0 to 9. The display occurs preferably in a spatial proximity, meaning next to or in the proximity of the shown operating parameters. The selection of the operating parameters occurs for example by touching with the finger for the shown operating parameter. Subsequently, this operating parameter is so to say activated and a key pad appears as a context menu on the display device beneath this operating parameter. Using the keyboard value only one desired value for this operating parameter can be provided. Therewith, new control values can be provided as desired values in order to enable an active intervention by a method according to the invention.

A further advantage is achieved when with the method according to the invention a color coding of the operating parameter is shown next to the at least one detected and displayed operating parameter. Particularly, this color coding can contain a correlation between an actual value and a desired value. Thereby, for example the use of a marking color like red or green color can illustrate the quality of the present operating situation. In case the color coding is in the green area, no alteration has to occur. In case the color coding is in the red area the operating personnel is intuitively pointed to a problematic situation during the control of the winding device. An easier, faster and securer intervention is therewith ensured. For example a colored evaluation of the entered or recognized operating parameter is provided. Naturally, also a display of a slider and therewith a continuous color alteration for the colored evaluation can be used. The alteration can for example be associated to a variation of the color depth or the saturation. The variation can thereby occur in an area between 0 and 100%.

Likewise, it is an advantage when with the method according to the invention an input of a desired value for the at least one detected and displayed operating parameter occurs. Like it has already been described in this manner an active intervention in the regulation can be provided. Naturally, the method according to the invention additionally includes a step of a comparison between the actual value and a saved desired value of the detected operating parameters. Therewith, a control, particularly a regulation, for the whole winding device or for a separate functional unit can be provided. The input occurs preferably via a touch-sensitive display, which has already been described as a touchscreen.

It is further an advantage when with the method according to the invention the input of the desired value occurs in the same display level like the display of the at least one detected and displayed operating parameters. With other words no alteration has to be performed in the display illustration. Rather, during the input of the desired value for an operating parameter the visibility of the further displayed operating parameters concerning their actual values remains. The input of a new desired value does not interfere with the visibility of the actual operating situation. This leads to a further increase of the level of safety of the method according to the invention. Moreover, the input of the desired value occurs faster since no switch of the display is necessary.

Likewise, it can be an advantage when with the method according to the invention additionally an input of a selection and an arrangement of winding sleeves on a winding shaft of the winding device occur. As winding sleeves carrier materials have to be understood, which subsequently to a termination of the winding of the film establish the respective film role as a product. The winding sleeves are accordingly preferably configured in a hollow cylindrical manner and are applied on the winding shaft of the winding device. In order to be able to wind up with a higher speed and a higher throughput preferably two or even more winding sleeves are assembled at the same time on an accordingly longer winding shaft. For different subsequent manners of production different widths of the winding sleeves are necessary. The variability of these winding sleeves can occur automatically according to the invention. Thus, the assembly and the selection of the winding sleeves concerning their widths can be performed likewise via the display device. Particularly, the selection occurs from a magazine with at least two panels, whereby in each panel a defined winding sleeve is arranged separately according to a determined width. So an automatic denomination of at least one winding sleeve occurs, which replaces a manual pushing of the winding sleeves. The performance occurs automatically in the machine. Typical widths for winding sleeves are for example in the area between approximately 400 and approximately 1000 mm.

It is likewise an advantage when with the method according to the invention at least one of the following operating parameters is detected and displayed by at least one functional unit:
Rotational speed or peripheral speed of a supply roller,
Leading between two neighboring supply rollers,
Contact pressure of a supply roller,
Wrap angle of a supply roller,
Web tension on a supply roller.

The rotational speed of the supply roller can be affected by a corresponding drive motor. A peripheral speed control can occur via a tapping at the motor or via a separate sensor means. The leading is a peripheral speed difference concerning the supplied speed of the film between two neighboring supply rollers. In this manner the pretension in the supplied product namely the film is generated. If a contact is provided via a supply roller for example in a wound up film roll, likewise the pressing force of this supply roller can serve as an operating parameter according to the invention via an adjustable cylinder or adjustable motor. For an angular alteration of the supply roller, which can likewise occur via actuators, wrap angles can be varied.

Likewise, the subject matter of the present invention is a control device for the control of a winding device comprising a control unit, which is configured for the performance of a method according to the invention. Accordingly, a control device according to the invention involves the same advantages like they are described in detail in relation to the method according to the invention. Particularly, the control device already comprises the display device, which preferably comprises a touch-sensitive display, namely a touchscreen.

BRIEF DESCRIPTION OF THE SEVERAL VIEWS OF THE DRAWINGS

Further advantages, features and details of the invention result from the subsequent description, in which embodiments of the invention are described in detail in relation to the drawings. Thereby, the features described in the claims and in the description can be essential for the invention each single for themselves or in any combination. It is shown schematically:

DESCRIPTION OF SPECIFIC EMBODIMENTS OF THE INVENTION

Figure 1:
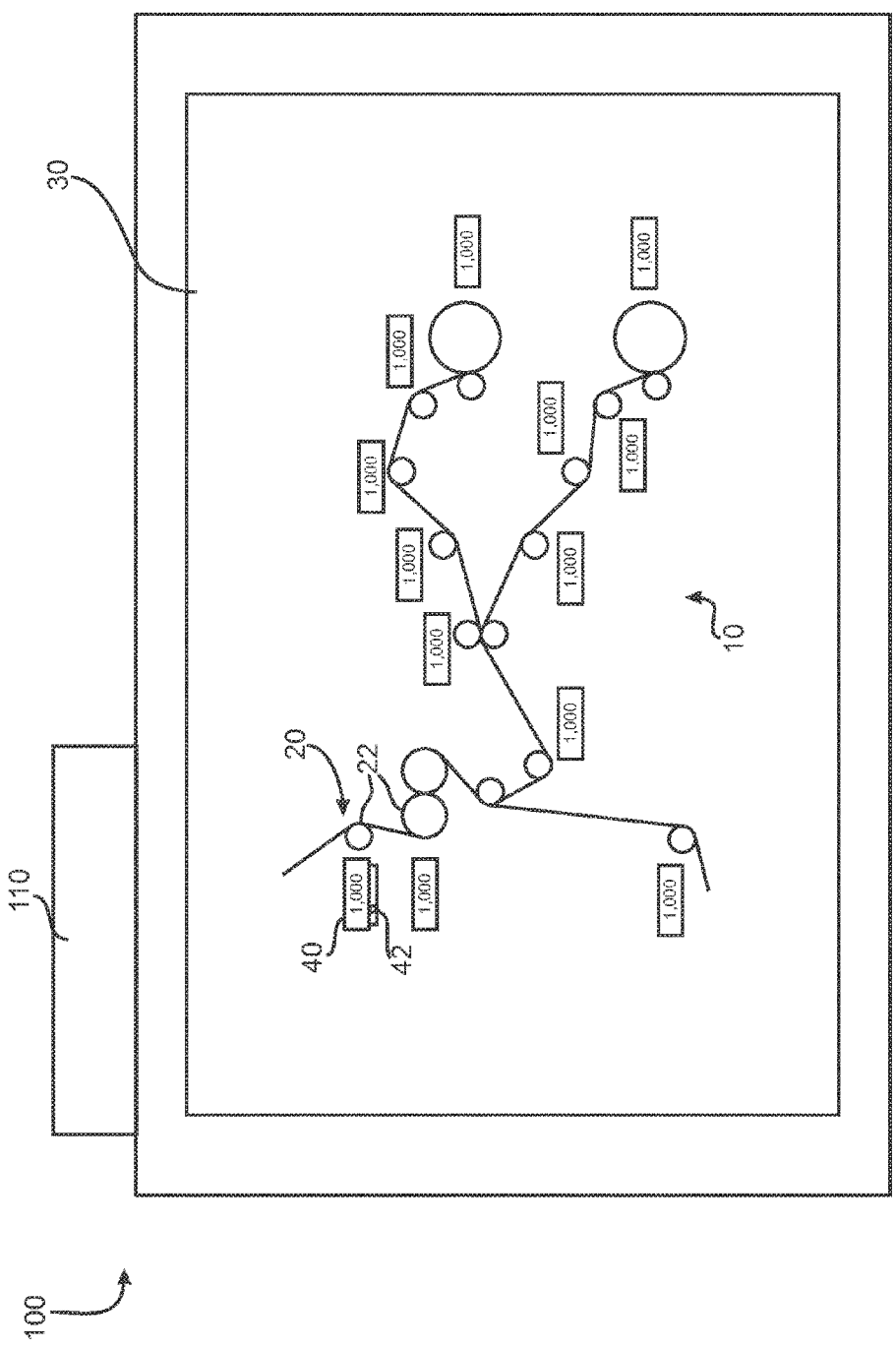
FIG. 1 a first illustration of a method according to the invention.

In FIG. 1 an embodiment of a control device 100 according to the invention is shown schematically. This comprises a display device 30 and a control unit 110. In the control unit 110 a calculation unit for the implementation of a computer program exists, which controls the different steps of the method.

Like it can be recognized in FIG. 1 on the display device 30, which is here configured as a touch-sensitive display, namely a touchscreen, a schematic illustration of the winding device 10 can be recognized. The winding device 10 comprises a plurality of functional units 20, which are all configured as supply rollers 22. Between the single supply rollers 22 the tension course of the film can be schematically recognized. Here, a winding for two winding rolls occurs in a clockwise manner.

Likewise, it can be recognized in FIG. 1 that in a spatial proximity to a plurality of the supply rollers 22 and therewith a plurality of function units 20 an operating parameter 40 is shown. This operating parameter 40 shows the presently detected actual value of this operating parameter 40 concerning the respective functional unit 20. Likewise, in the upper left of this display of an operating parameter 40 a color coding 42 can be recognized, which as a slider discloses a corresponding illustration compared to the desired value. In this manner likewise an illustration of the present workload can occur.

Figure 2:
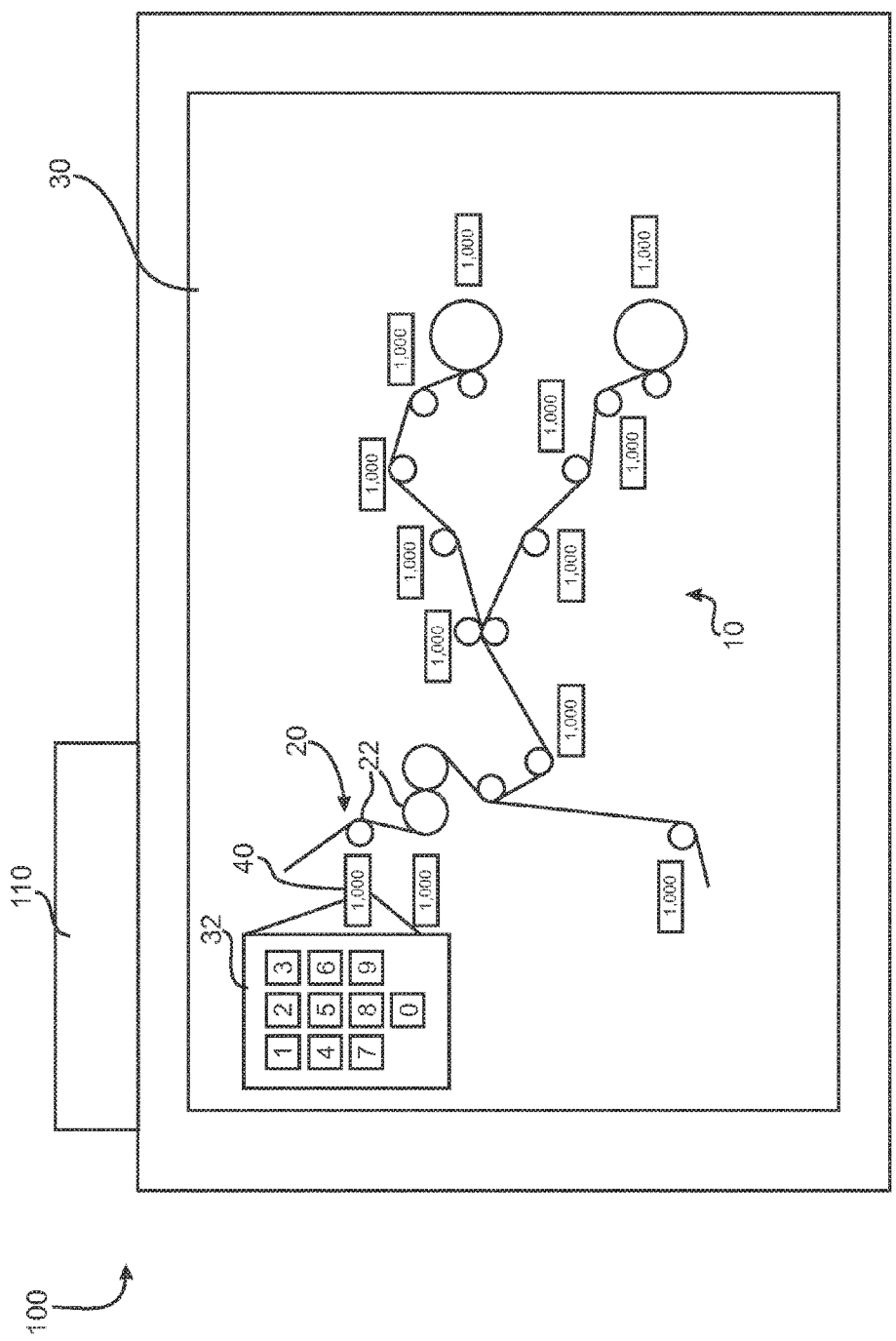
FIG. 2 a second illustration of a method according to the invention.

FIG. 2 shows additionally to a passive control possibility like already shown in FIG. 1 a possibility for an active regulation intervention. Here the operating parameter 40 in the upper left is selected for the corresponding functional unit 20, namely a supply roller 22. The selection occurs by touching the touch-sensitive display of the display device 30 on the respective operating parameter 40. This touching leads to an opening of a context menu, which is here configured as a key pad 32 with a numerical keyboard from 0 to 9. Now the input of the desired value can occur, which is provided for a subsequent regulation of the control device 100 for the winding device 10. Likewise, the use of pull down menus is possible, which contain a selection limitation of previously defined selection possibilities.

Figure 3:
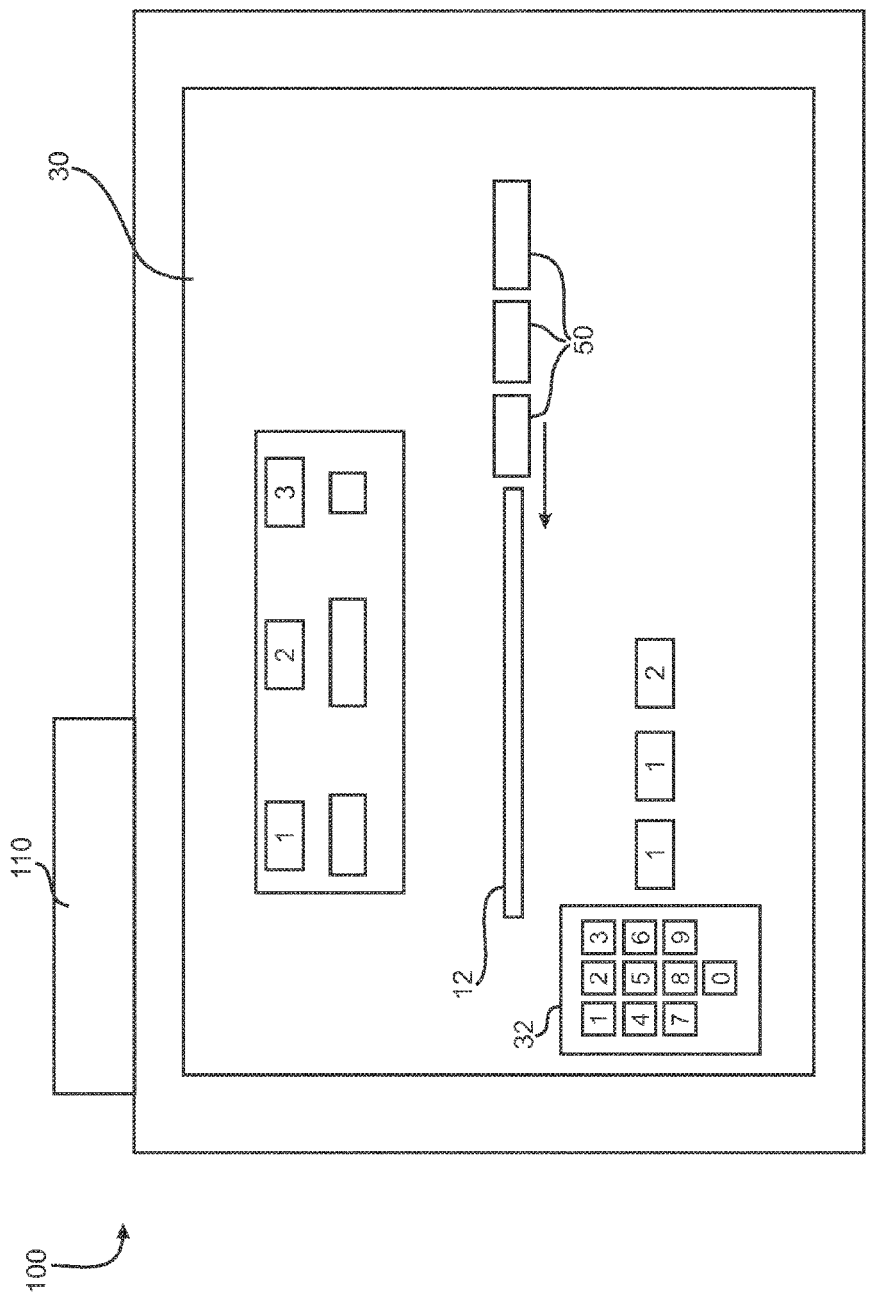
FIG. 3 a third illustration of a method according to the invention.

In FIG. 3 a part of a method configuration according to the invention is shown. Here, a magazine with three separate panels is schematically shown (digits 1 to 3) on the display device 30. Each of these three magazines comprises a certain width of a winding sleeve 50. Likewise, a winding shaft 12 is schematically shown, which is equipped with three winding sleeves 50 in different widths from the right side. Underneath the winding shaft 12 three added fields are intended, which can be charged with the help of the key pad 32 with the respective magazine number (1 to 3). In this manner here the number and kind of pairing of the winding sleeves 50 can be pretended. The pushing of this corresponding defined pairing occurs automatically to the winding device 10.

The previous description of the embodiments describes the present invention only within the scope of examples. Naturally, single features of the embodiments as far as technical meaningful can be freely combined with one another without leaving the scope of the present invention.

GLOSSARY

10 Winding device
12 Winding shaft
20 Functional unit
22 Supply roller
30 Display device
32 Key pad
40 Operating parameter
42 Color coding
50 Winding sleeve
100 Control device
110 Control unit

What is claimed is:
1. Method for monitoring a winding device, comprising the following steps:
Displaying of a schematic illustration of functional units of the winding device on a display device,

Detection of at least one operating parameter of at least one functional unit of the winding device, Displaying of the at least one detected operating parameter on the display device next to the schematic illustration of the corresponding functional unit.

2. Method according to claim 1,
wherein
the display steps occur on a display device in form of a touch-sensitive display.

3. Method according to claim 2,
wherein
during a selection of a displayed operating parameter a key pad is shown on the display device.

4. Method according to claim 1,
wherein
next to the at least one detected and displayed operating parameter a color coding of this operating parameter is displayed.

5. Method according to claim 1,
wherein
an input of a desired value occurs for the at least one detected and displayed operating parameter.

6. Method according to claim 5,
wherein
the input of the desired value occurs in the same display level like the display of the at least one detected and displayed operating parameter.

7. Method according to claim 1,
wherein
next to an input of a selection and an assembly of winding sleeves on the winding shaft of the winding device occurs.

8. Method according to claim 1,
wherein
at least one of the following operating parameters of at least one functional unit is detected and displayed on at least one functional unit:
Rotational speed of a supply roller
Leading between two neighboring supply rollers
Contact pressure of a supply roller
Wrap angle of a supply roller.

9. Method according to claim 1,
wherein
that displaying of the at least one detected operating parameter on the display device occurs next to the schematic illustration of the corresponding functional unit on one and the same display level.

10. Method according to claim 1,
wherein
sensor units are intended in order to enable the detection of operating parameters.

11. Control device for monitoring a winding device comprising a control unit, which is configured for the performance of a method according to the invention according to claim 1.

* * * * *